United States Patent
Keely, Jr. et al.

(10) Patent No.: US 6,756,970 B2
(45) Date of Patent: *Jun. 29, 2004

(54) PEN-BASED COMPUTER SYSTEM

(75) Inventors: Leroy Bertrand Keely, Jr., Portola Valley, CA (US); Daniel E. Evanicky, San Jose, CA (US); Charles Ford Alexander, Mountain View, CA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,114

(22) Filed: Nov. 20, 1998

(65) Prior Publication Data

US 2002/0063694 A1 May 30, 2002

(51) Int. Cl.[7] .............................. G08C 21/00; G09G 5/00
(52) U.S. Cl. ..................... 345/173; 345/179; 178/18.01; 178/18.03; 178/18.08
(58) Field of Search ................................. 345/179, 173, 345/178, 104; 349/60, 155, 133, 157; 178/18.01–18.11; 359/483, 81, 82

(56) References Cited

U.S. PATENT DOCUMENTS

| | | | |
|---|---|---|---|
| 3,947,842 A | | 3/1976 | Hilsum et al. |
| 4,723,836 A | * | 2/1988 | Kono et al. ................... 178/18 |
| 4,835,347 A | | 5/1989 | Watson |
| 4,868,351 A | | 9/1989 | Watanabe et al. |
| 4,939,318 A | | 7/1990 | Watson et al. |
| 5,044,733 A | * | 9/1991 | Kamoi et al. ................. 359/81 |
| 5,153,386 A | * | 10/1992 | Siefer et al. .................. 178/18 |
| 5,194,852 A | | 3/1993 | More et al. |
| 5,218,173 A | * | 6/1993 | Garwin et al. ................ 178/18 |
| 5,223,964 A | * | 6/1993 | Nagano et al. ............... 359/81 |
| 5,239,489 A | | 8/1993 | Russell |
| 5,247,198 A | | 9/1993 | Homma et al. |
| 5,274,198 A | * | 12/1993 | Landmeier .................... 178/18 |
| 5,307,190 A | * | 4/1994 | Wakita et al. ................ 359/82 |
| 5,381,160 A | | 1/1995 | Landmeier |
| 5,410,334 A | | 4/1995 | Comerford |
| 5,434,370 A | | 7/1995 | Wilson et al. |
| 5,566,013 A | * | 10/1996 | Suzuki et al. ................. 359/81 |
| 5,619,431 A | | 4/1997 | Oda |
| 5,633,660 A | * | 5/1997 | Hansen et al. ............. 345/173 |
| 5,689,667 A | | 11/1997 | Kurtenbach |
| 5,721,853 A | | 2/1998 | Smith |
| 5,739,888 A | * | 4/1998 | Ogura et al. ................ 349/155 |
| 5,748,110 A | | 5/1998 | Sekizawa et al. |
| 5,771,039 A | * | 6/1998 | Ditzik ........................ 345/178 |
| 5,808,707 A | * | 9/1998 | Niibori et al. ................ 349/60 |
| 5,812,232 A | * | 9/1998 | Shiroto et al. .............. 349/155 |
| 5,838,413 A | * | 11/1998 | Matoba et al. ............. 349/155 |
| 5,847,690 A | * | 12/1998 | Boie et al. .................. 345/104 |
| 6,008,940 A | * | 12/1999 | Michihata et al. ......... 359/483 |
| 6,144,435 A | * | 11/2000 | Yokoyama et al. ......... 349/133 |
| 6,184,954 B1 | * | 2/2001 | Inoue et al. ................ 349/155 |
| 6,184,967 B1 | * | 2/2001 | Lagerwall et al. .......... 349/155 |
| 6,187,440 B1 | * | 2/2001 | Wu ............................. 349/155 |
| 6,215,476 B1 | * | 4/2001 | Depew et al. .............. 345/173 |

* cited by examiner

Primary Examiner—Bipin Shalwala
Assistant Examiner—David L. Lewis
(74) Attorney, Agent, or Firm—Banner & Witcoff, Ltd.

(57) ABSTRACT

The invention provides a liquid crystal, TFT display with driver lines folded around a light pipe and a digitizer. The digitizer has grid routing lines folded around a shield where the shield is connected to a shield of the computer system electronics. The display drivers and grid controller are mounted inward of an edge of the display. The glass layers surrounding the beads can have different thicknesses and composition while the liquid crystal surrounding the beads can be at a pressure less than atmospheric pressure. A surface of the display provides pen/pencil on paper feel as a digitizer pen is moved across the surface via hardness coatings and surface topography.

13 Claims, 9 Drawing Sheets

PEN-BASED COMPUTER SYSTEM

CROSS REFERENCE TO RELATED APPLICATION

This application is related to U.S. having SGI, application Ser. No. 09/196,100, filed Nov. 20, 1998, entitled A Pen-Based Interface For A Notepad Computer by Keely et al and incorporated by reference herein.

BACKGROUND OF THE INVENTION

1. Field of the Invention

The present invention is directed to a system that combines a pen digitizer into a notepad (or notebook) type computer and, more particularly, providing such a system by nesting the digitizer in the display and within the thickness and area of a traditional notepad (or notebook) and providing a pen/paper feel while improving the quality of the image displayed.

2. Description of the Related Art

Typical pen-based computers include a tablet-type pen digitizer technology which is used for input. Combining the tablet technology into a notepad or notebook type computer will result in a thick and heavy device making it difficult for such a device to be perceived as a true notepad type device. Other portable, pen-based input devices do not function as computers but rather as limited input devices. What is needed is a notepad computer that integrates the technology for pen based input into the display, without creating a heavy or thick device.

The display area of a pen-based computer over which the input with a pen is permitted is substantially smaller than the surface area of the device because regions on the edge of the input field are needed for input circuits and electronics. What is needed is a system that maximizes the input field size relative to the extent of the top surface of the notepad device.

Displays that use liquid crystal technology are prone to distortions in the image when a user contacts a pen or finger to the display surface. This creates visual distractions while using the device. What is needed is a system that prevents such distortion without preventing such contact.

Users of pen-based input devices also need to become accustomed to the tactile feel of the device as the input pen is moved across the surface. This feel is substantially different from the feel of a pen against paper. What is needed is a system in which users immediately feel they are using a familiar surface.

Electronic information systems capable of emulating pen and paper would have tremendous advantages in usability over traditional computers, with which interaction is much less intuitive and less direct.

Electromagnetic pen technology is the most capable of providing the desired input performance (accuracy, stability, and expressiveness), and liquid crystal displays are the most capable of providing the desired output performance (high resolution, brightness, contrast, and color depth, with small size, weight, and power consumption). However, attempts to date at using the technologies together have resulted in compromising all of these qualities.

Specifically, all pre-existing techniques for integrating electromagnetic pen and liquid crystal display (LCD) technologies have suffered from: 1. Inaccuracies, instabilities and/or parallax that make it impossible for the tip of the pen to provide a true representation of where ink will appear, as it does with pen and paper; 2. Susceptibility to electromagnetic interference that contributes to the inaccuracies, especially when the sensor is integrated tightly with system electronics; 3. Compromises to the optical characteristics of the displayed image due to losses in brightness and contrast from additional optical layers and surface reflections; and 4. Compromises to the size and weight of the system.

What is needed is a means of integrating electromagnetic pen and liquid crystal display technologies in a way that avoids compromising the performance of each.

SUMMARY OF THE INVENTION

It is an object of the present invention to provide a true notepad-type (or notebook) computer that integrates the electronics for pen-based input into the display.

It is a further object of the present invention to integrate electromagnetic pen digitization technology into a display module.

It is another object of the present invention to provide a notepad computer that maximizes the input field size relative to the extent of the front surface of the notepad.

It is a further object of the present invention to provide a system that prevents display distortion caused by touching the display screen.

It is an additional object of the present invention to provide the feel of a pen against paper.

It is also an object of the present invention to provide materials and processing techniques which, when applied to device construction, yield further improvements in pen and display performance and quality.

It is an object of the present invention to provide an electromagnetic pen digitizer construction which achieves high performance input in combination with a thin film transistor (TFT) display.

It is an object of the present invention to provide a system in which the system electronics can be located in close proximity to the display therefore.

The above objects can be attained by a notepad (or notebook) computer that includes a liquid crystal, thin film transistor display with driver lines connected to the transistors and folded around a light pipe and digitizer so as to integrate the digitizer into the notepad computer while maintaining a minimal height and weight. The digitizer has a grid whose conductors connect to routing lines which are routed behind a shield, which is optionally connected to or integrated with additional shields of the computer system electronics, such as the processor. The display electronics and digitizer electronics are mounted inward of an edge of the display keeping the display as narrow as possible. The display layer, which includes the display addressing circuits, has spacer beads whose distribution density, compressibility, and migration are controlled. The glass layers in front of and behind the beads can have different thicknesses and different composition. A surface of the display provides a pen/pencil on paper feel as a digitizer pen is moved across the surface.

These together with other objects and advantages, which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Minimizing a display module's weight and border width (the distance by which the overall size of a display module exceeds its active area) are crucial to reducing the weight and size of a portable system, whose heaviest and largest component is usually the display module itself. Designing a system to accommodate use of an electromagnetic digitizer has heretofore required significant increases in size and weight. The invention provides an integrated structure by which pen and display technologies can be combined in a single module with a minimum increase in weight and border width. In particular, the digitizer grid is positioned directly behind the display light-pipe reflector, and held by the same parts which hold the display itself together. The display's connections to its row and column driver electronics are folded back past the edges of the digitizer grid, and then inward so that the row and column driver electronics continue inboard behind the digitizer grid. A shield is used to isolate the digitizer grid from electromagnetic field disturbances caused by the row and column driver circuits. The signal lines or tails from the edges of the digitizer grid are routed inward between this shield and the row and column driver circuits, to grid send and receive circuits which are inboard of, and in the same plane as, the row and column driver circuits. The tails are signal lines which route grid lines and the electronics which drive and receive their signals, and are inboard of the edges of the display. The resulting module is one which can be built around a standard thin film transistor (TFT) addressed flat panel display, positions the digitizer grid as close to the display surface as is possible without interfering with the display optics, and weighs less and has a smaller border than is possible without its nested construction.

Figure 1:
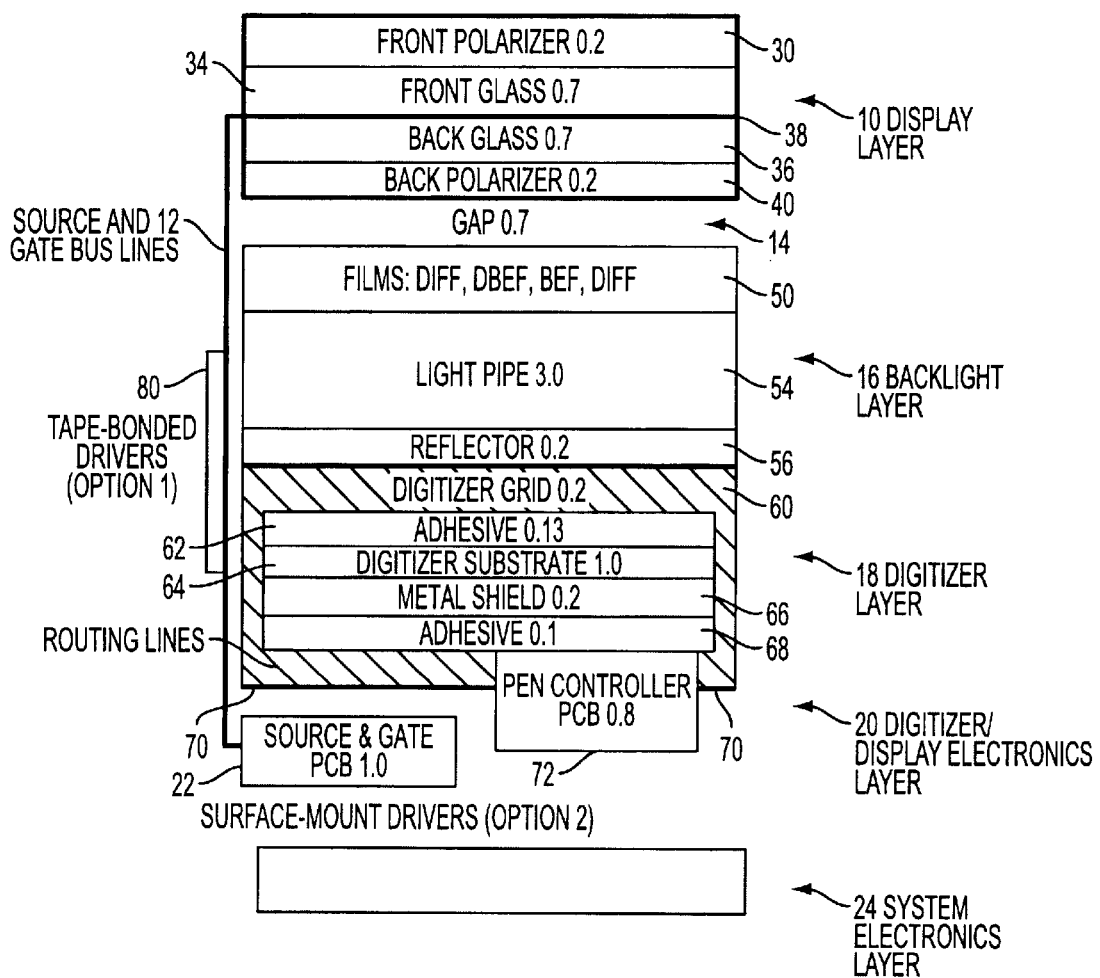
FIG. 1 depicts layers of a display digitizer assembly.

The system of the present invention includes several layers as depicted in FIG. 1 where the numbers noted within each layer denote the thickness of the layer in millimeters (mm). A liquid crystal display layer 10 preferably includes sublayers which will be discussed in greater detail later herein. The display layer 10 preferably includes a thin film transistor layer (TFT) although other liquid crystal display technologies could be used, such as a dual super twisted nematic (DSTN) type display. The layer 10 could be called a pixel addressing layer. Bus signal lines 12 for the source and gate addressing lines of the TFT emerge from this layer. These signal lines 12 wrap around a gap 14 approximately 0.7 mm thick, a back-light layer 16 which supplies light for the display 10 and a digitizer layer 18 to connect to an electronics layer 20 which includes the electronics for the display particularly the display therefore, drivers 22 as well as electronics for the digitizer layer 18. In the notepad-type preferred embodiment, a system electronics layer 24 up to ½ inch thick includes the remaining components of a notepad computer such as a processor, memory, modem, etc. This layer also includes a conventional shield (not shown) essentially surrounding the electronics and designed to reduce the emission of electromagnetic interference produced by the system electronics.

The display layer 10 includes a front polarizer 30 having a typical thickness of 0.2 mm and surface coatings and other features which will be discussed in more detail herein. The front glass 34 and a back glass 36 sandwich a TFT, a color filter and liquid crystal layer 38 from which the lines 12 extend. A back polarizer 40 completes the display layer.

The back light layer 16 includes one or more optical films 50 which can serve to diffuse, collimate, filter and/or pre-polarize the light. The films 50 are held between the display and a light pipe 54 which guides and evenly distributes light to be transmitted through the liquid crystal display (LCD), and a reflector 56 is held behind the light pipe 54.

The digitizer layer 18 includes a digitizer grid 60 bonded 62 to a digitizer substrate 64. A metal shield 66 is bonded to the back of the substrate 64 and the routing lines are bonded 68 behind the shield 66. A suitable pen, grid and controller can be obtained from Calcomp of Scottsdale, Ariz. The grid routing lines 70 fold around the substrate 64 and shield 66. The digitizer grid 60 and pen controller 72 operate by producing an electromagnetic field which interacts with one or more coils in the pen from which the pen position, angle, and stylus pressure are determined. The shield 66 is designed to prevent noise produced by the pen controller electronics 72 and the system electronics layer 24 from interfering with the determination of position by the digitizer grid 60, and prevent unwanted absorption of the magnetic fields produced by the grid and pen. The shield 66 may be electromagnetically coupled to a shield of the electronics layer 24.

In making the digitizer layer 18, the digitizer grid 60 and substrate 64, which are supplied as a component and typically comprise an insulated flexible printed circuit, are laid flat with the grid routing lines also laid out flat. The metal shield 66 is placed on the substrate 64 and an adhesive is applied thereto. The grid routing lines 70 are folded over the shield 66, the controller 72 is attached to the lines 70 and both are pressed into contact with the adhesive. This forms a digitizer layer module that can be positioned or placed as a unit.

Shown as an option in FIG. 1 is positioning the drivers 80 on a side of the stack of components. This option may be preferred for shortening display signal propagation line length, provided the drivers are not so wide as to thicken the module overall in this configuration.

Figure 2:
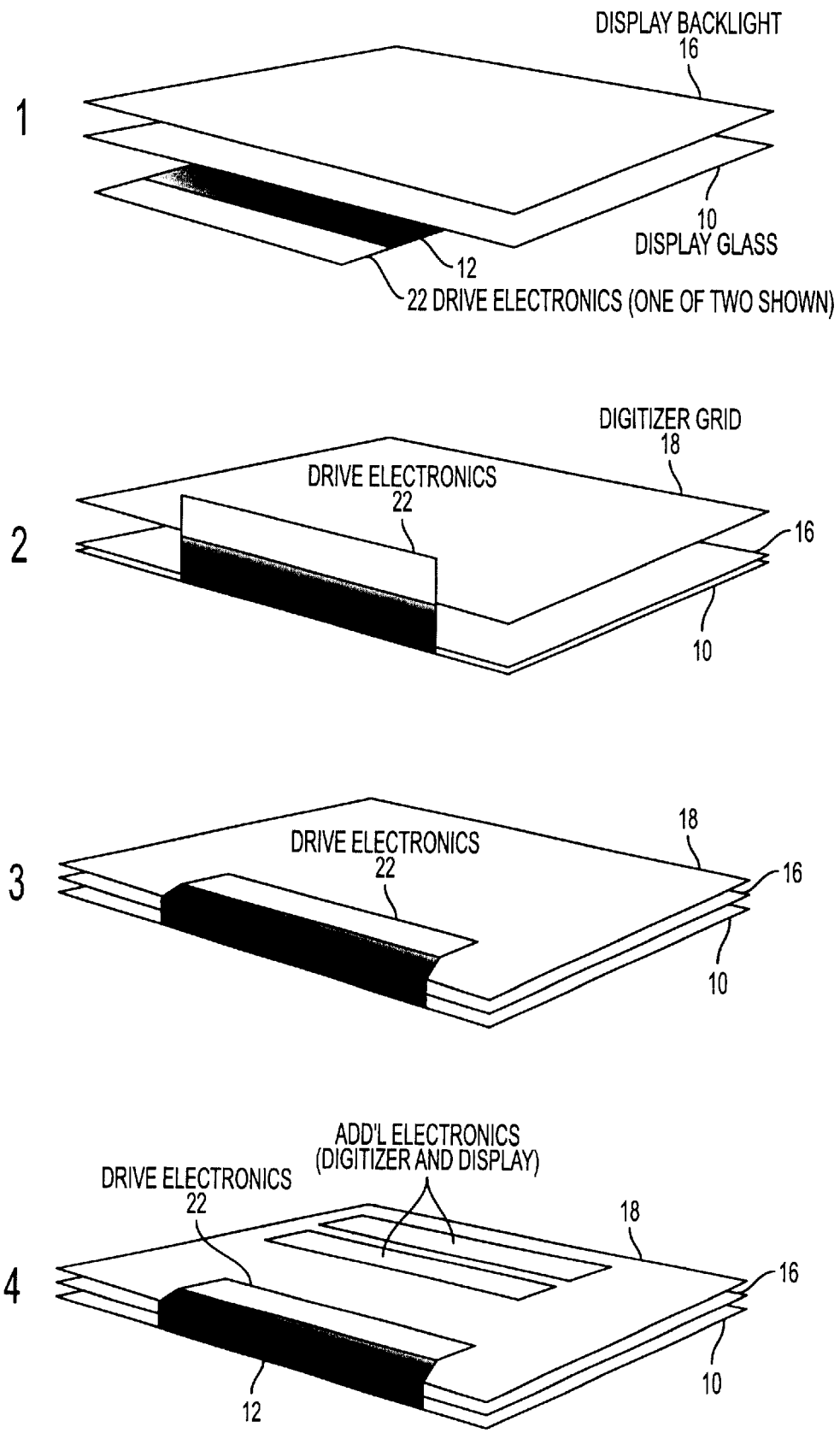
FIG. 2 depicts a process of folding display drive lines around layers according to the present invention.

In wrapping the driver lines 12 around the layers 16 and 18 and nesting the digitizer inside the display, the first step (1) is to lay the lead lines 12 (and attached to the flat pack drive electronics 22) of the display layer 10 open or flat, as depicted in FIG. 2. An edge type spacer (not shown) which provides gap 14 is placed behind the display layer 10 and the back light layer 16 is placed behind the spacer. In typical lap top and table devices, the next layer is a structural layer immediately behind the light pipe that holds the many display layers together from the rear. This plastic spacer layer is typically 1.5 mm thick and is removed or not provided in the present invention. In place of the spacer layer the invention substitutes the digitizer layer 18. The second step (2), is to bond or lay the digitizer layer 18 directly against the back light layer 16. Next (3), the lines are folded around the layers 10, 16 and 18 and the drive electronics 22 are folded into place behind the grid layer 18. Finally (4), any additional electronics for the display or grid, such as digitizer controller, are fixed in place inboard of the display edges.

Figure 3:
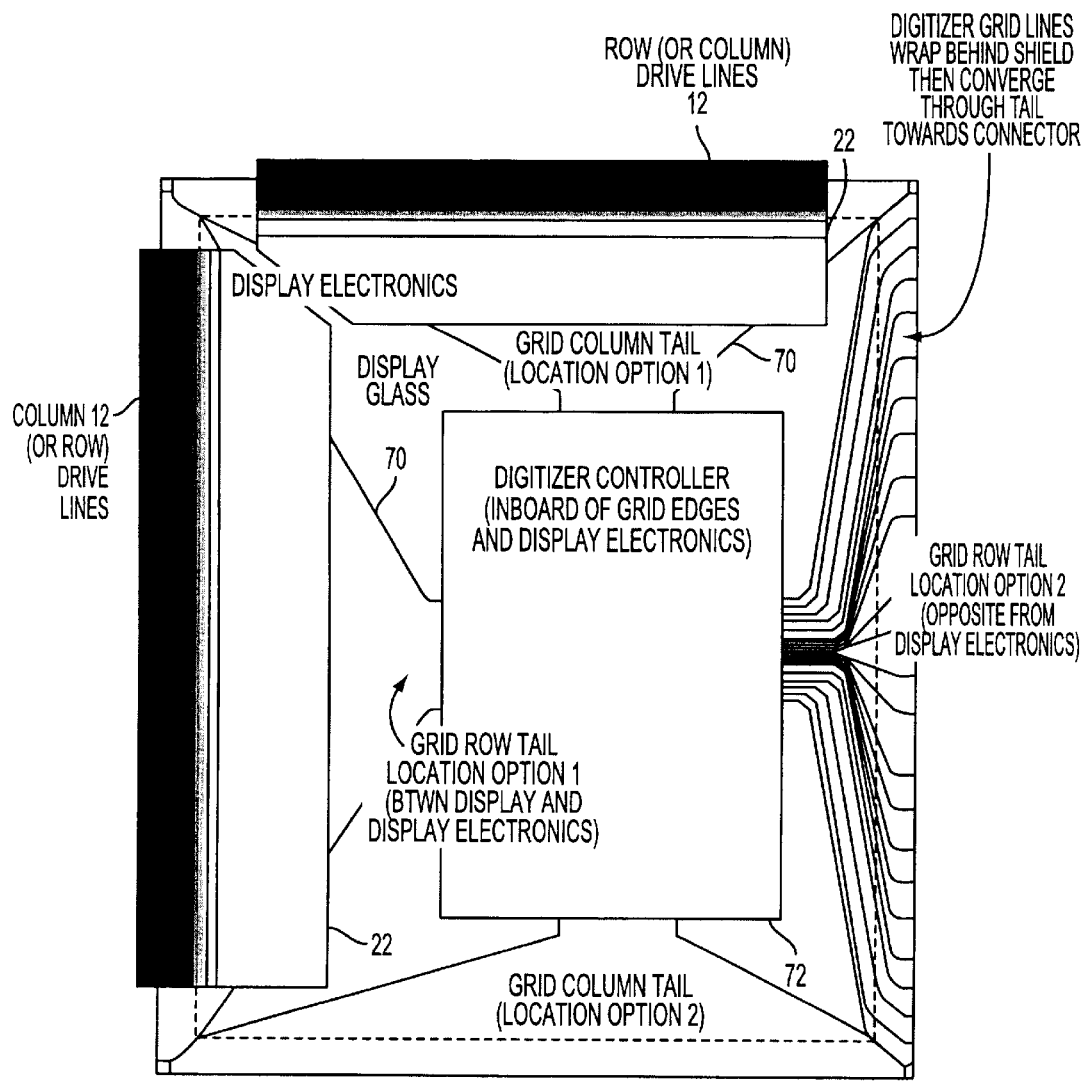
FIG. 3 illustrates a layout of components.

When the unit is completed, the layout of the components on the bottom of the unit (looking from the behind the display) will preferably be as in option 1 illustrated in FIG. 3 where the grid routing lines 70 will route from one pair of sides and the display lines 12 will wrap the same pair of sides (where the dashed line in this figure represents display active area). The display electronics may include both the drivers for the TFT as well as the display controller. Another option is to have the grid routing lines 70 and display driver lines 12 fold around different pairs of sides of the unit as depicted by option 2. A still further option is to provide the display drivers on a separate substrate on the side of the unit, as depicted in FIG. 1, option 1. It is important that with any of the options that the border outside the active area (dashed line) be held as low in width as possible and preferably less than about 5 mm.

Figure 4:
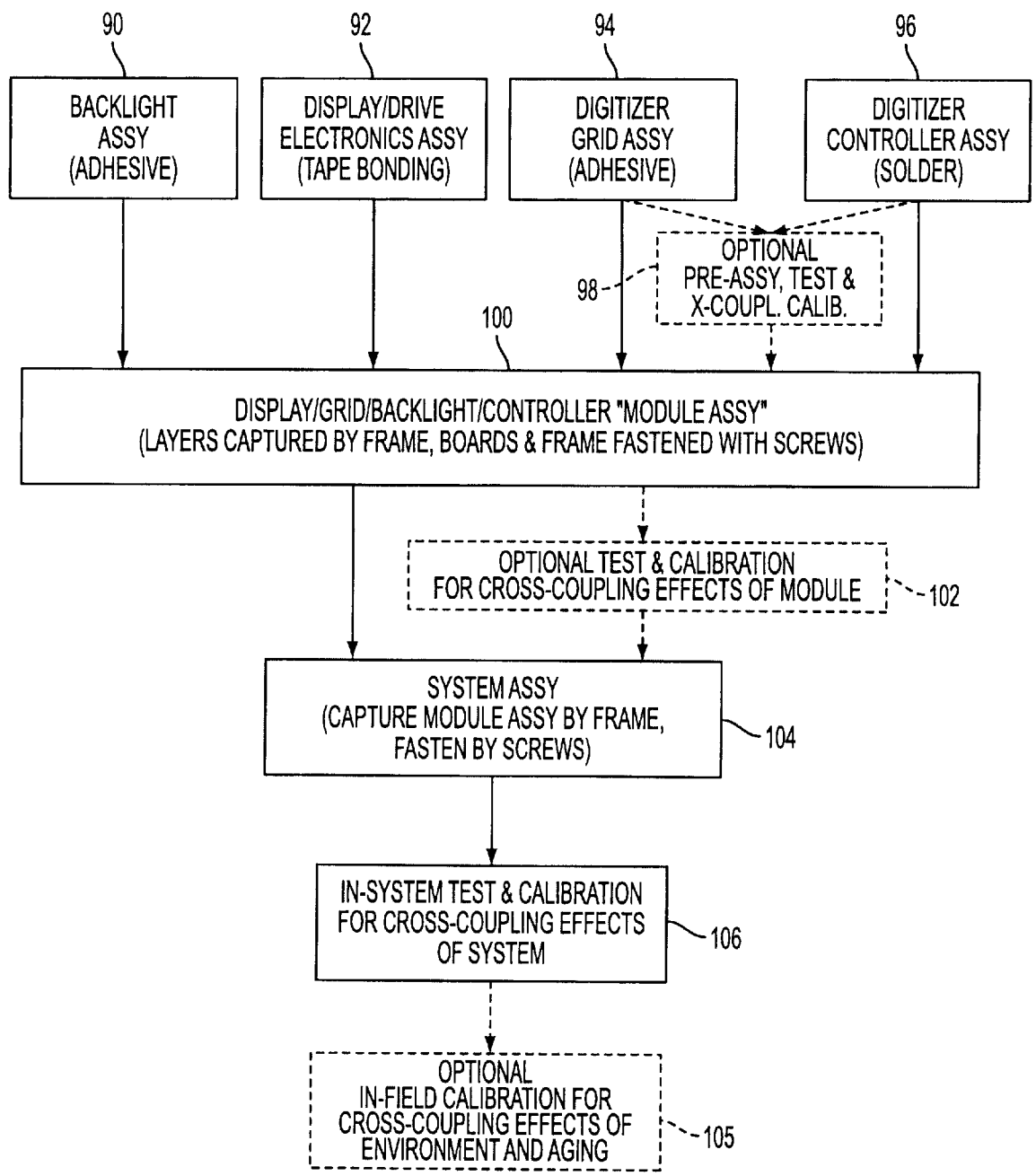
FIG. 4 illustrates a process of assembly of the invention, and in particular, is a flowchart of the steps of the process for assembling the integrated pen/display module, integrating the module into a system, and calibrating in situ.

The assembly of the entire notepad computer unit into a case can be accomplished most efficiently in a process as depicted in FIG. 4, where some operations are performed in parallel and some in series. The assembly typically uses plastic snaps that hold the layers together and to a plastic frame where the frame is part of the assembled unit. In a first assembly stage, the steps of assembling 90 back light layer 16, assembling 92 the display (and driver) layer 10, assembling 94 the digitizer grid, substrate and shield layer 18 along with assembling 96 the digitizer controller are performed in parallel. At the end of this stage, these subcomponents or layers can be tested and calibrated which is particularly shown as an option 98 for the programmable digitizer controller because of its sensitivity to external interference. Next, the layers or subcomponents are assembled 100 into a frame as previously discussed and again optionally tested and calibrated 102. Then, the system electronics 24 that include the processor are assembled into the frame and attached 104. At this time the grid shield 66 is coupled to or integrated into the system electronics shield. This is accomplished by connecting edges of the digitizer shield 66 to the system electronics shield at regular intervals using electrical contacts, such as spring/grounding posts. The display layers and system layers are held in close proximity to each other by the notepad or notebook computer case. At this point the entire system is tested and calibrated 106 to remove any cross coupling effects between the grid and the system electronics. A field test and calibration can also optionally be performed 105.

Because of the introduction of an electromagnetic field-based input system into the computer there is a need to minimize ferrous materials in the construction of the computer. This is accomplished by making the computer case of plastic where the case forms a frame around the edge of the display. Because of this use of plastic, the mechanical stability of the pen/display and the system as a whole can be compromised especially when the unit is frictionally fit into the case as is conventional. Adhesive bonding the display layer 10 directly to the front case by applying an adhesive to the entire inside rim of the display opening of the case provides the needed mechanical stability without use of ferrous materials, thereby providing the desired stiffness, producing permanent alignment, shock control, the spread of impact forces along edges, and liquid seal, with minimum cost, weight, and number of parts.

With the construction discussed above several important characteristics are provided for the notepad computer. The integrated pen/display module is an integrated structure by which pen and display technologies are combined into a single module with a minimum increase in weight and border width. The digitizer grid 60 is located directly behind the display light pipe reflector 56, by the same parts which hold the display itself together. The display's connections to its row and column driver electronics are folded back past the edges of the digitizer grid, and then inward so that the row and column driver electronics are positioned inboard of the edge of the display glass 34 and behind the digitizer grid 60. A shield is used to isolate the digitizer grid 60 from electromagnetic and magnetic field disturbances caused by the display, digitizer, and system electronics. The lines 70 of the digitizer grid 60 are run inward between the shield 66 and the row and column driver circuits 22, to grid control receive circuits 72 which are inboard of the edge of the glass 34, and in the same plane as, the row and column driver circuits 22. The resulting module is one which: can be built around a standard TFT mask; positions the digitizer grid as close to the display surface as is possible without interfering with the display optics; and weighs less and has a smaller border than is possible without its unique nested construction.

To provide a pen and paper feel for the user as the user uses a stylus or pen to interact with the notepad computer described herein, the present invention combines materials, shapes, surface textures, and requirements for pen pressure sensitivity and range of movement to achieve pen-on-paper and pencil-on-paper feel. To prevent excessive wear of the pen a conventional 3H hard coat, such as PMMA, available from Nitto Denko of Japan, cured to a 3H hardness is preferably applied to the front polarizer 30 and a pen with a 2H maximum hardness pen tip is used. In essence, the pen hardness is softer than the hardness of the display. The surface of the polarizer of the front glass is provided with surface bumps/pits for anti-glare and to prevent sub-pixel interference while also giving a pen on paper feel and appearance. These bumps/pits have size, depth and other geometric characteristics which are chosen to prevent glare, without introducing "sparkling", as well as provide friction and noise as a pen is moved across the surface, and stiction when the pen is held still against the surface, simulating a pen/pencil on paper feel. The size and shape of the topology of the bumps and pits needs to be of a character such that light from a display pixel is not sufficiently refracted to intersect light coming from another pixel.

Figure 5:
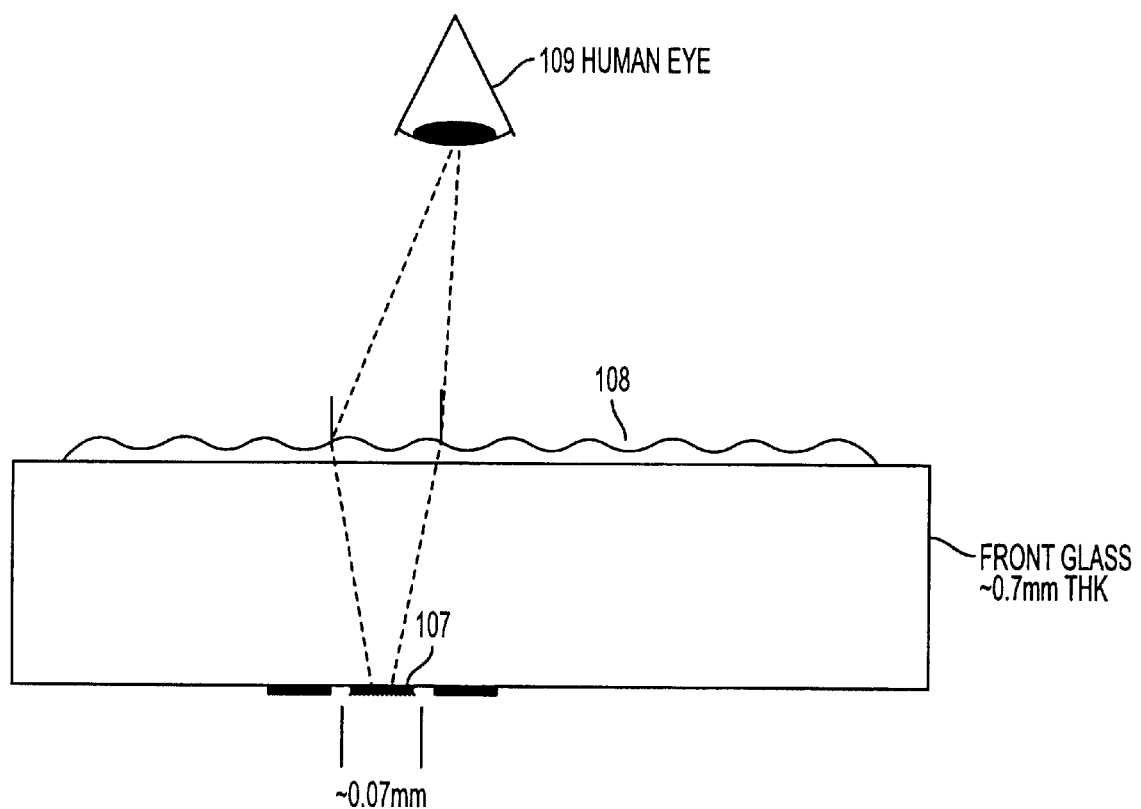
FIG. 5 depicts a characterization of optical artifacts avoided by the invention.

Close visual inspection of a white display field on a color LCD with a thick front glass and a very fine dot pitch (125 dpi) reveals splotches of red and green in the white. This artifact is called sparkling because it moves and changes as the eye moves from side to side. The splotches are interference patterns created when the anti-glare surface refracts light from red, green and blue subpixels in a manner that varies cyclically over a distance larger than the size of a pixel. This problem is depicted in FIG. 5 which shows light from a middle subpixel 107 refracted by the antiglare surface 108 and appearing to the eye 109 as if it comes from an adjacent pixel. This optical interference pattern can be eliminated by choosing an anti-glare surface with larger or smaller bumps/pits. This can be done by visual inspection where a coating would be applied and inspected and another coating with larger or smaller features tried when a sparkling is detected.

Figure 6:
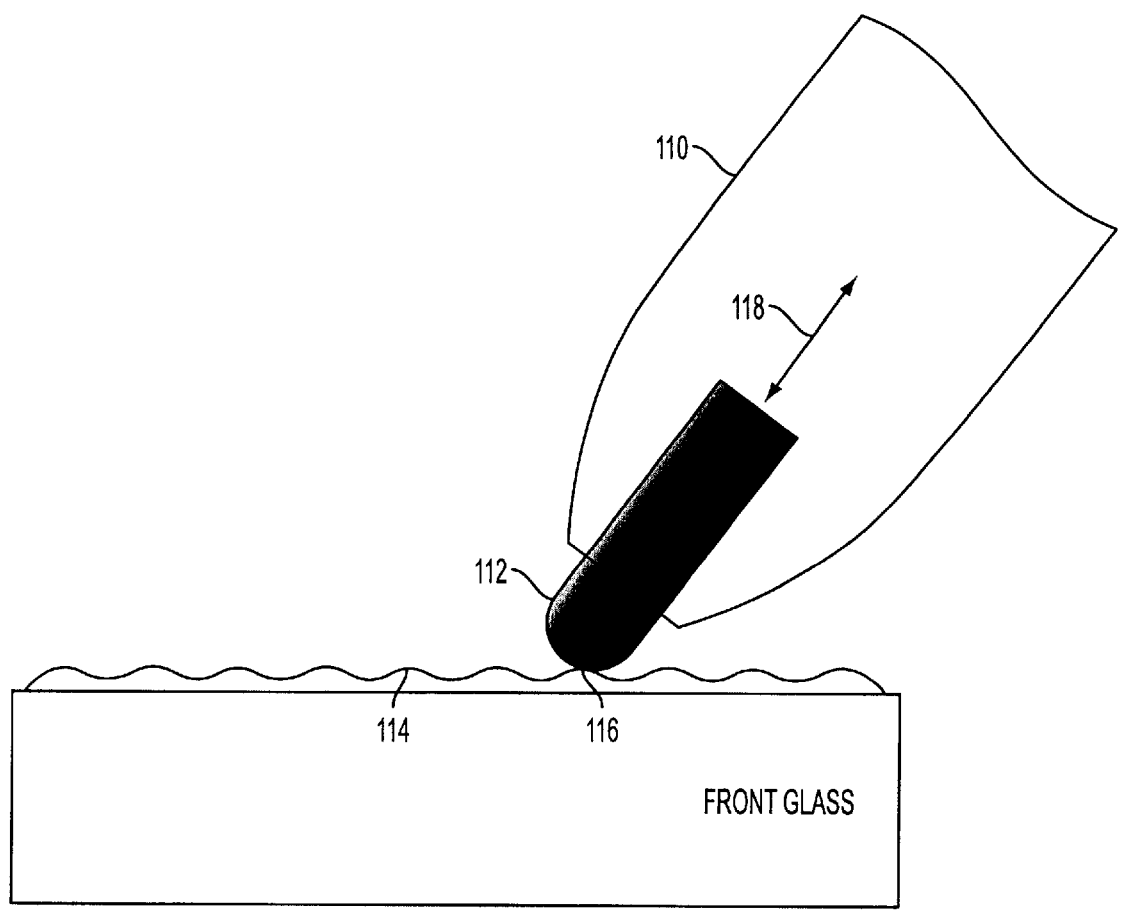
FIG. 6 depicts a pen and a display surface.

The pen 110 as depicted in FIG. 6 is provided with a tip 112 with an initial shape of a hemisphere of about 1.5 mm diameter minimum. The 2H tip is made from a material such as nylon which wears by abrasion, does not bind to the anti-glare surface 114 and does not contain fillers, such as glass or similar material greater than 2H hardness, and interacts with the bumps/pits 116 of the anti-glare surface to create a ballpoint pen-like feel. Alternatively using a pen tip material of S hardness increases stiction when held statically against the anti-glare surface and increases friction when moved. Side play of the pen tip so as to create a pencil or fountain pen feel needs to be controlled to ±0.1 mm in order to maintain this feel. The tip sensitivity or pressure required on the tip to cause a signal to be produced must not be greater than about 15 g nor less than about 5 g. The axial movement 118 of the tip and resulting tip feedback force are also controlled to increase proportionately to simulate compression of a thin pad of paper (0.75 mm/100 g). This can be accomplished by any suitable means, such as a compressible elastomeric cone.

Visible color and shade distortions are created when pressure is applied to the front surface of a liquid crystal display. Microscopic analysis reveals that these distortions result from a momentary upset in the alignment of the liquid crystal molecules, which occurs because a minute change in the gap (on the order of a change in gap thickness of 0.1 microns) between the glass layers creates a hydrostatic flow whose shear force overcomes the anchoring forces which bind the liquid crystal molecules to their respective alignment layers causing liquid crystal to flow away from the pressure spot and to flow back once pressure is released. This effect can be dramatically reduced by techniques described herein which prevent the flow or pooling of liquid crystal molecules (so-called because the appearance is like that of touching a pool of water) in response to momentary local pressure differences. Typical conventional approaches include the addition of another layer of glass or plastic above and separated from the display glass that is deflected by the touch. The addition of another layer of glass or plastic is detrimental to a notepad computer because of the added weight and particularly so to one which uses a pen digitizer because the separation of the pen from the digitizer grid is increased by the extra glass layer causing digitization errors and visual misalignment commonly called parallax.

Figure 7:
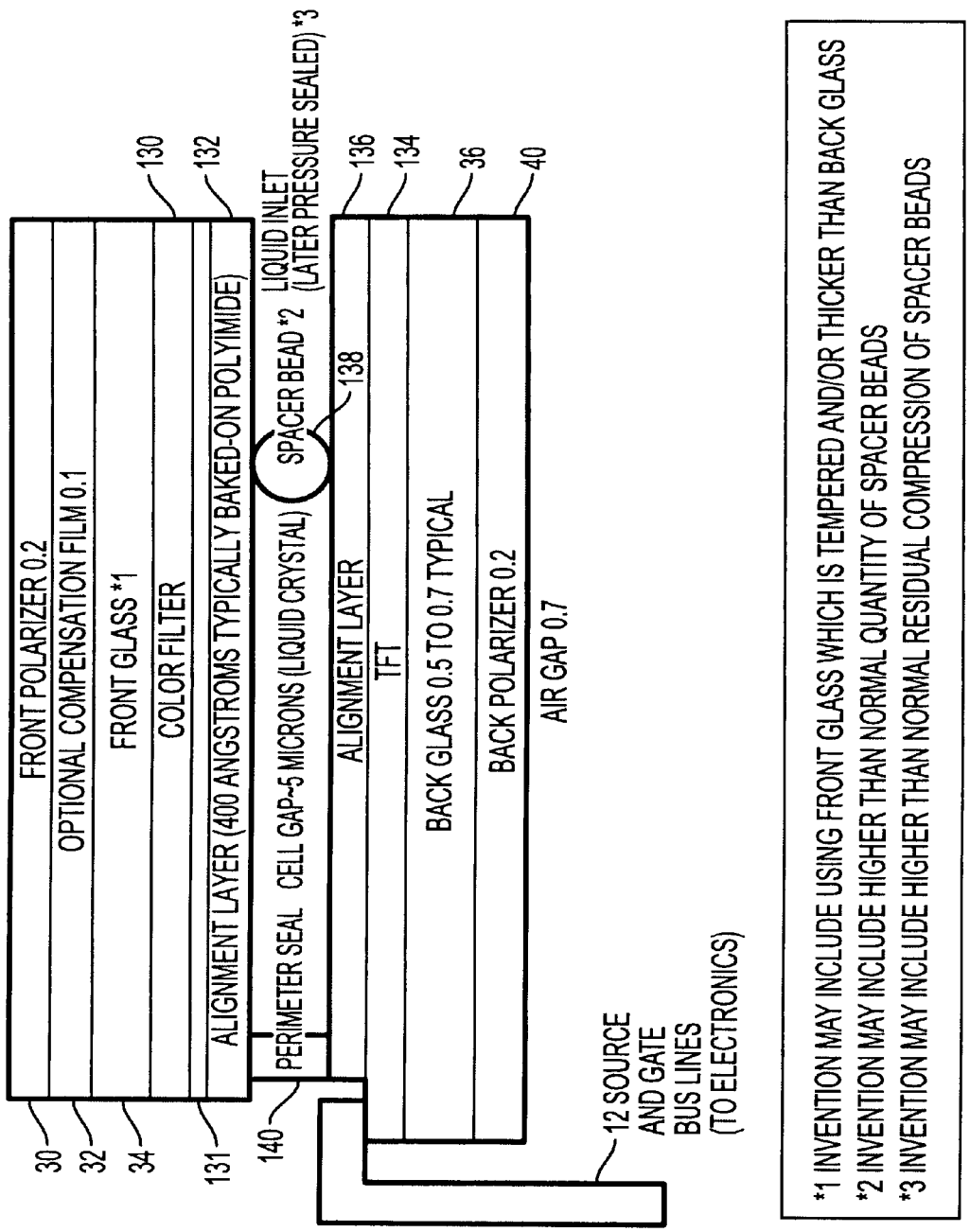
FIG. 7 shows a display layer.

FIG. 7 illustrates, in greater detail than provided in FIG. 1, the layers of a liquid crystal display which resists "pooling" under pen or finger pressure. In particular, on the inside of the front glass 34 is a color filter layer 130 approximately 1 to 2 microns thick. This layer divides each pixel into red, green and blue areas known as sub-pixels. A first alignment layer 132 is also provided and is typically a baked-on polyamide approximately 400 angstroms thick. A common ITO electrode layer 131 is positioned between the filter layer 130 and the alignment layer 132. On the inside of the back glass 36 a thin film transistor layer 134 is formed on which a second alignment layer 136 is formed. Between the alignment layers 132 and 136 spacer beads 138 are provided to keep the layers 132 and 136 separated, and the liquid crystal resides between the layers 132 and 136 and around the beads 138.

To prevent the undesired distortion-creating flow, local pressure differences in the liquid crystal must be reduced to keep shear forces from overcoming the forces that anchor the liquid crystal molecules to the alignment layers.

To keep these local pressure differences low, local deflection of the front glass with respect to the back glass must be controlled. The invention provides several methods which can be used alone or in combination to accomplish this.

In the first method the support surface area provided by the beads is increased to decrease the pressure on the individual beads, thereby decreasing their compressibility, and thus increase the resistance to deflections of the front glass with respect to the back glass. This is accomplished by flattening out the variations in the glass substrates to increase the number of beads contacting both surfaces. The beads of a display can be applied to the TFT substrate by either wet or dry sprays before cell assembly occurs. A dry spray is preferred because the electrostatic charges created on the beads during spraying causes the beads to both stick to the TFT layer surface and maintain a reasonably uniform dispersion access the inside of the cell because of electrostatic repulsion. First, a perimeter seal material 140 (see FIG. 7), containing 50-micron lengths of glass spacer rods, is applied to four edges of the glass layers 34 and 36 (including the layers inside the glass layers) with one or more liquid inlets approximately 25 mm wide along one edge left open. This seal is cured under pressure to adhere the edges of the front and back glass to each other at a desired cell gap distance apart (typically 5 microns) which is controlled by glass fibers included in the seal material. A vacuum of typically 50 mTorr or less is created in the gap. This can be done by placing the entire assembly in a vacuum chamber. The edge with liquid inlet(s) is submerged in liquid crystal material and the vacuum is released by slowly re-filling the vacuum chamber with an inert gas (typically Nitrogen or Argon) to create a filling pressure which, along with capillary forces, propels liquid crystal material into the cell gap. Next, in the invention, additional mechanical pressure is applied to the exterior of the glass layers after filling to compress the elastic spacer beads 138. This also flattens out the glass substrates to provide a greater number of beads contacting both the front and back glass.

As an option to the pressure step discussed above, heat is applied to bond the thermoplastic spacer beads 138 with the alignment layer 132 and 136 by slightly exceeding the glass transition melting temperature of the spacer beads. This further increases resistance to compression and migration of spacer beads.

After sealing and the release of mechanical pressure, ambient air pressure prevents glass layers 34 and 36 from deflecting apart. This together with the increased resistance to compression of the spacer beads 138 because more substrate surface area is in contact with the beads, eliminates the localized glass deflections creating pressure differences which create shear forces which overcome the anchoring forces and create the momentary flow that disturbs the twist of the liquid crystal molecules.

Figure 8:
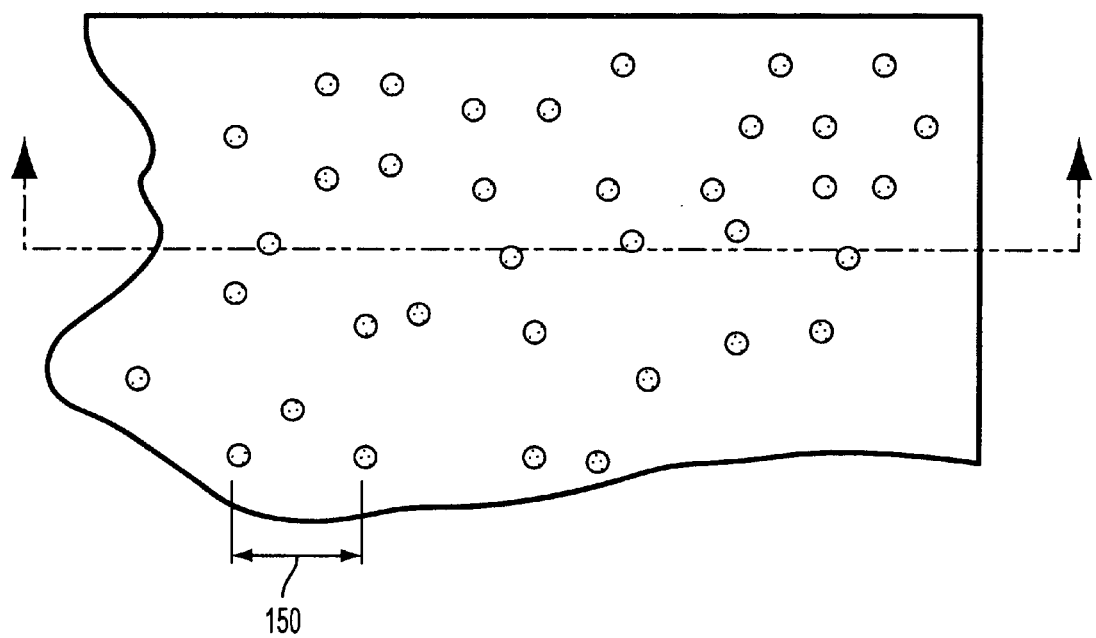
FIG. 8 shows spacer beads within a display layer.

A second technique increases the number of beads in the gap to thereby increase the area resisting the deflection force. Spacer beads 138 are typically included in the liquid crystal material to maintain a constant cell gap. Local beam deflection can be prevented by increasing the quantity of those spacer beads until the mean distance between beads is less than or equal to a quarter of the thickness of the glass and distributing them randomly in the bead space as depicted in FIG. 8. In the case of 0.7 mm glass, the density of spacer beads should be brought up to about 300 per square mm. This is so that sufficient beads will be positioned on top of the TFT, gate line and source line structures to provide a typical beam length 150 of about 0.125 mm. With a typical front glass thickness the front glass is prevented from locally deforming between the beads. Increasing the density of beads beyond this level further decreases the elasticity of the sandwich in direct proportion to the number of beads, and further improves control over the cell gap, however, the excessive number of beads degrades the optics of the display by occupying a significant portion (5% or more) of the cell area.

A third technique of reducing the local deflection without degrading the display, while taking a somewhat increased processing time, is to subject the glass sandwich to even higher pressure associated with injection of the liquid crystal material, so as to ensure a residual compression of spacer beads when external pressure returns to a normal (atmospheric) level because the liquid crystal is at less than atmospheric pressure. Typically, the pressure on the glass sandwich can be increased to about 50 psi without damaging or otherwise compromising the display characterization. This method results in increasing the pressure that a finger or pen must exert to move the glass layers closer together, thus decreasing the flex and the unwanted effect.

A fourth technique which reduces deflection related distortion but does not account for torsion related distortion is to use a back glass 36 which is thinner and thus more flexible than the front glass 34, so that the back glass can deform along with the front glass without compressing the beads, thus keeping the cell gap constant. Preferably, borosilate front glass or other non-alkaline glass with a surface irregularity of less than 0.05 microns and up to about 1.1 mm thick 34 is used with borosilicate back glass as low as about 0.5 mm thick.

A fifth technique is to increase the stiffness of the front glass and to decrease the stiffness of the back glass by varying the material formulations and/or processing of front and back glass. The stiffness of a sheet of glass can be increased or decreased by varying the material formulation of the glass, or by subjecting the glass to processes that change the Young's modulus by building up internal stresses in the glass. Substituting soda lime glass for the back glass 36, or tempered glass for the front glass 34, further improves control over cell gap.

Figure 9:
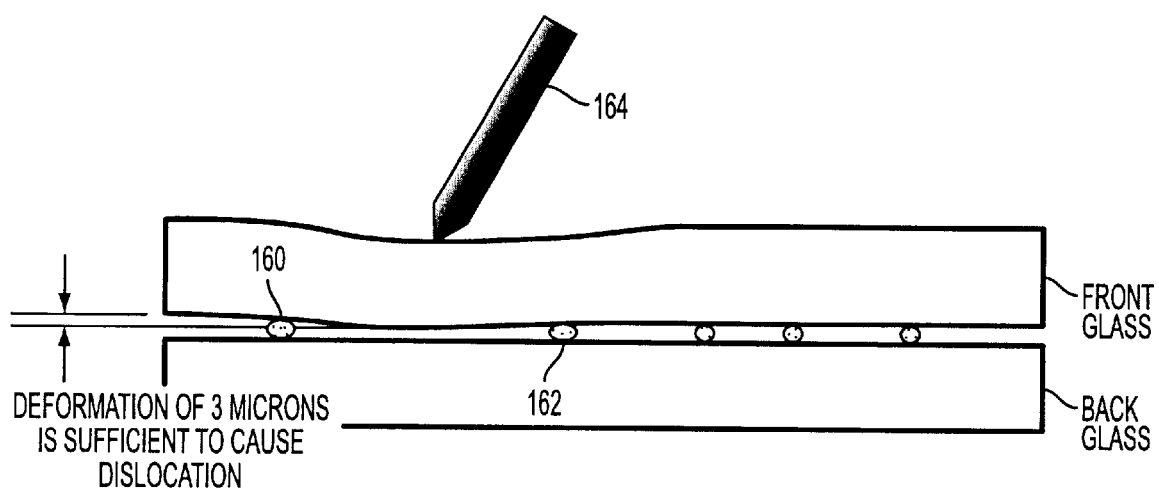
FIG. 9 depicts bead compression.

A sixth technique can be used when dislocations are caused by bead compression and involves decreasing the compressibility of the spacer beads themselves. FIG. 9 depicts spacer beads 160 and 162 deformed by the pressure applied by a pen. Increasing the hardness of the beads by using a harder plastic or glass will prevent the compression. However, the beads should not be made so hard that they create point pressures on the cell sputtered layers sufficient to cause them to break.

The present invention has been described with respect to a notepad computer and the technology can also be applied to notebook computers, lap top computers, pocket-sized personal information managers, systems with other LCD technologies such as DSTN or DMTN and other pen technologies such as resistive, capacitive or optical touch input. The invention applies to, as well, to other portable computer devices in which the system electronics are held in close proximity to the display and which can use non-traditional input devices such as a stylus.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
  a light source having a front surface and a rear surface;
  a digitizer abutting the rear surface of said light source;
  a liquid crystal display having:
    a rear surface confronting the front surface of said light source,
    a display controller located rearward of the digitizer,
    row and column driver electronics that are connected to the display controller and also located rearward of the digitizer,
    driver lines that connect pixel cells of the liquid crystal display to the row and column driver electronics and that are folded around said light source and said digitizer,
    sub-pixels, and
    a front glass having a polarizer and a 3H hardness hard coat surface on an external surface of said polarizer, and wherein
  the hard coat surface comprises bumps and pits of size and depth sufficient to reduce glare and contribute to a pen/pencil on paper feel when a stylus tip is moved against the hard coat surface, and
  the thickness of the front glass is approximately 10 times greater than the diameter of a sub-pixel.

2. An apparatus as recited in claim 1, further comprising a stylus with a tip having a 2H maximum hardness.

3. An apparatus as recited in claim 1, further comprising a stylus with a tip having a S hardness.

4. The apparatus of claim 1, wherein the liquid crystal display further comprises:
  a first alignment layer on said front glass;
  a liquid crystal layer;
  a second alignment layer;
  a back glass beneath said second alignment layer;
  spacer beads positioned between said first and second alignment layers, wherein:
    said beads occupy less than about 5% of a liquid crystal cell area and are provided in a quantity sufficient to provide a mean distance between beads that is less than or equal to one quarter of the thickness of the first glass, and
    the spacer beads retain residual compression from assembly of the display.

5. A display as recited in claim 4, wherein the residual compression of the spacer beads exceeds the compression that would result from only atmospheric pressure upon the display.

6. A display as recited in claim 4, wherein said spacer beads are glass beads.

7. The apparatus of claim 1, wherein the liquid crystal display further comprises:
  a first alignment layer on said front glass;
  a liquid crystal layer;
  a second alignment layer;
  a back glass beneath said second alignment layer;
  spacer beads positioned between said first and second alignment layers, wherein said liquid crystal layer surrounding said beads and between said alignment layers is at a pressure less than atmospheric pressure.

8. A display as recited in claim 4, further comprising a color filter layer between said front glass and first alignment layer.

9. The apparatus of claim 1, wherein the liquid crystal display further comprises:
  a first alignment layer on said front glass;
  a liquid crystal layer;
  a second alignment layer;
  a back glass beneath said second alignment layer;
  spacer beads positioned between said first and second alignment layers, wherein said back glass is thinner than said front glass and the back glass can deform with the front glass without compressing the spacer beads.

10. The apparatus of claim 1, wherein the liquid crystal display further comprises:
   a first alignment layer on said front glass;
   a liquid crystal layer;
   a second alignment layer;
   a back glass beneath said second alignment layer;
   spacer beads positioned between said first and second alignment layers, wherein said front glass has a different composition and is stiffer than said back glass.

11. An apparatus as recited in claim 1, wherein said digitizer further comprises:
   a substrate;
   a metal shield having a first surface facing the substrate and a second surface facing rearward, said metal shield separating the substrate from the display controller and from the driver electronics;
   a digitizer grid having conductor routing lines routed behind said shield and confronting the second surface of said shield; and
      a grid controller coupled to said routing lines and mounted inward of an edge of said shield.

12. An apparatus as recited in claim 11, further comprising system electronics confronting the second surface of said metal shield and having an electromagnetic noise shield coupled to said metal shield.

13. A notepad computer, comprising:
   a light source having a front surface and a rear surface;
   a digitizer abutting the rear surface of said light source, said digitizer comprising:
      a metal shield having first and second surfaces,
      a digitizer grid confronting the first surface of said shield, having conductor routing lines routed behind said shield and confronting the second surface of said shield, and
      a grid controller coupled to said routing lines and mounted inward of an edge of said grid;
   a liquid crystal display having:
      a rear surface confronting the front surface of said light source,
      a display controller located rearward of the digitizer,
      row and column driver electronics that are connected to the display controller and also located rearward of the digitizer,
      driver lines that connect pixel cells of the liquid crystal display to the row and column driver electronics and that are folded around said light source and said digitizer,
   a first glass,
   a first alignment layer on said first glass,
   a liquid crystal layer,
   a second alignment layer,
   spacer beads positioned between said first and second alignment layers, and precompressed against said first and second alignment layers, said precompression exceeding that which would be imposed by only atmospheric pressure upon the display,
   a second glass deformable with the first glass without compressing the spacer beads,
   liquid crystal surrounding said beads and between said alignment layers at a pressure less than atmospheric pressure,
   sub-pixels, the thickness of the first glass being approximately 10 times greater than the diameter of a sub-pixel, and
   a 3H hardness hard coat surface associated with an external surface of said first glass and providing a pen/pencil on paper feel as a digitizer pen is held against or moved across said surface;
   computer system electronics confronting the second surface of said metal shield and having an electromagnetic noise shield coupled to said metal shield; and
   a plastic case having a display opening with a rim adhesively bonded to the first glass.

* * * * *

UNITED STATES PATENT AND TRADEMARK OFFICE
CERTIFICATE OF CORRECTION

PATENT NO. : 6,756,970 B2  Page 1 of 1
DATED : June 29, 2004
INVENTOR(S) : Leroy Bertrand Keely, Jr.

It is certified that error appears in the above-identified patent and that said Letters Patent is hereby corrected as shown below:

Column 1,
Line 5, after "U.S." delete "having SGI,".

Signed and Sealed this

Third Day of May, 2005

JON W. DUDAS
*Director of the United States Patent and Trademark Office*